Figure 1:
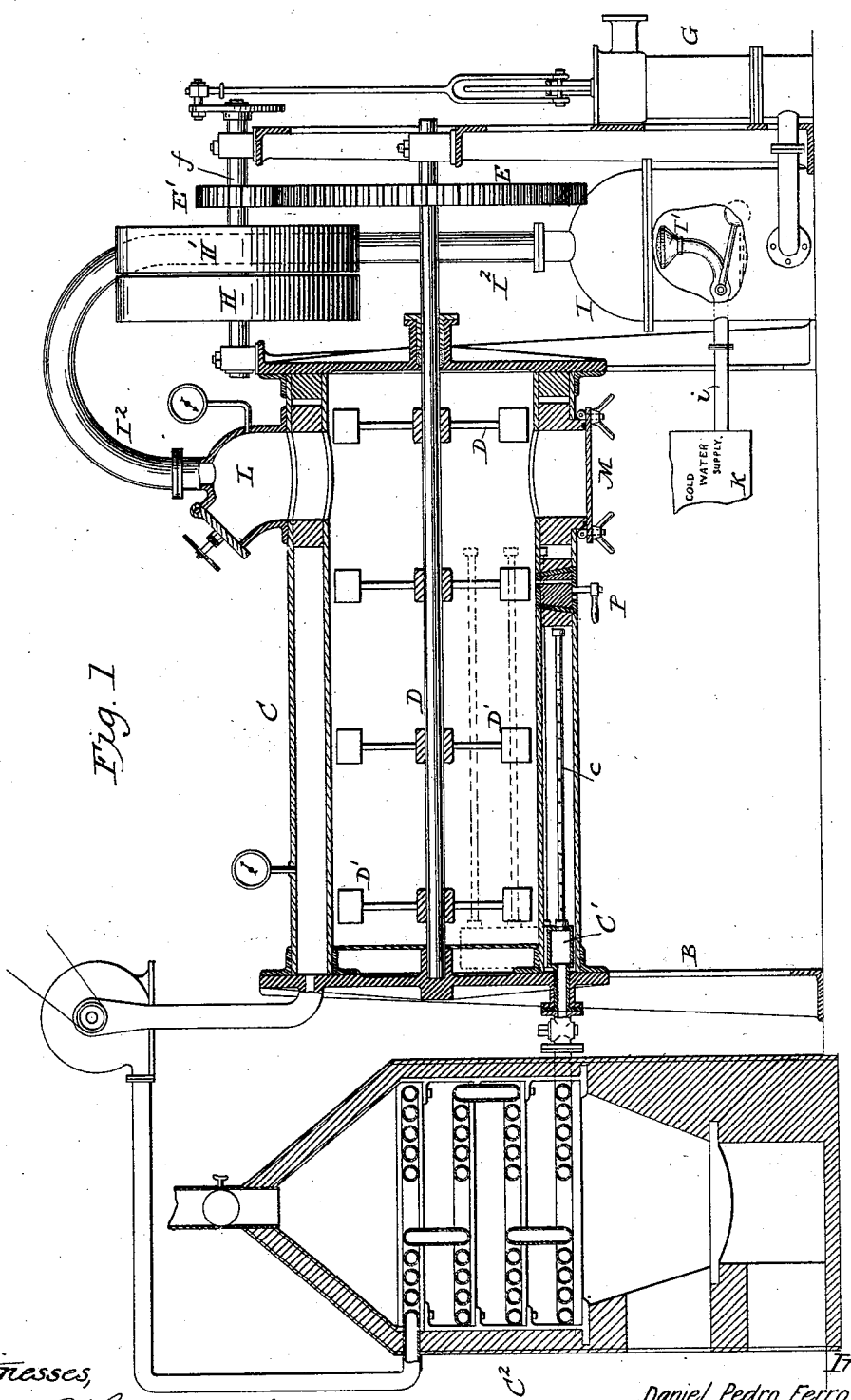

(No Model.) 2 Sheets—Sheet 1.

D. P. F. CARDOZO.
APPARATUS FOR ROASTING COFFEE OR OTHER SUBSTANCES.

No. 509,298. Patented Nov. 21, 1893.

Witnesses
Sidney P. Hollingsworth
W. Washington Miller

Inventor,
Daniel Pedro Ferro Cardozo
by his attorneys
Baldwin Davidson Wight (No Model.) 2 Sheets—Sheet 2.
D. P. F. CARDOZO.
APPARATUS FOR ROASTING COFFEE OR OTHER SUBSTANCES.
No. 509,298. Patented Nov. 21, 1893.
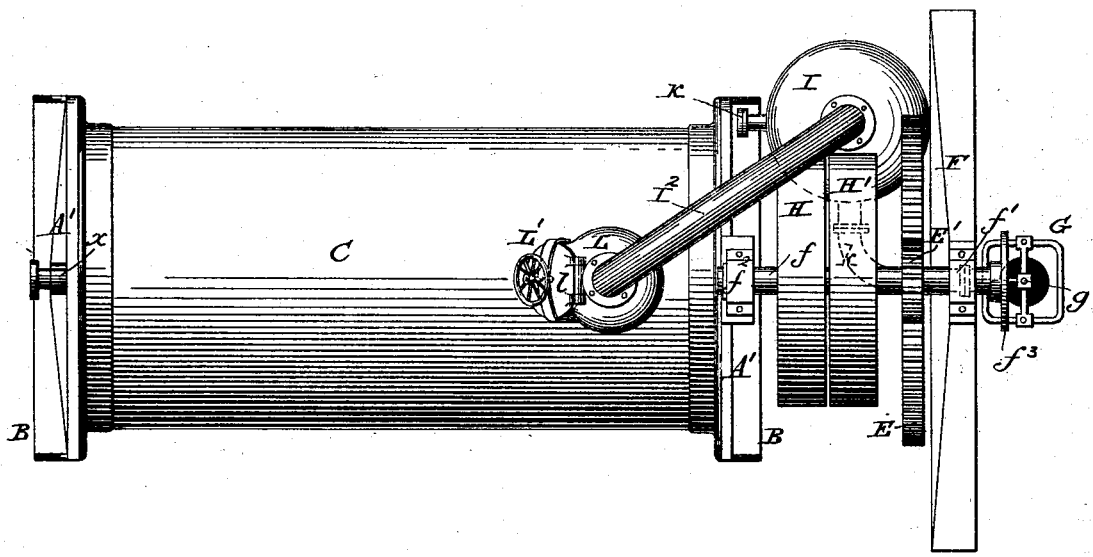
Fig. 2.
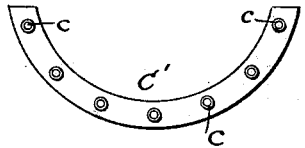
Fig. 3.
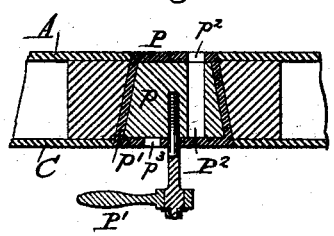
Fig. 4.
Fig. 5.
Witnesses,
Sidney P. Hollingsworth
W. Washington Miller
Inventor,
Daniel Pedro Ferro Cardozo
by his attorneys
Baldwin Davidson & Wight

UNITED STATES PATENT OFFICE.

DANIEL P. F. CARDOZO, OF NEW YORK, N. Y.

APPARATUS FOR ROASTING COFFEE OR OTHER SUBSTANCES.

SPECIFICATION forming part of Letters Patent No. 509,298, dated November 21, 1893.

Application filed February 18, 1893. Serial No. 462,881. (No model.) Patented in France March 28, 1884, No. 161,243, and in Belgium December 1, 1884, No. 67,059.

*To all whom it may concern:*

Be it known that I, DANIEL PEDRO FERRO CARDOZO, doctor of science of the University of Brussels and architect of the School of Agriculture of Paris, a citizen of the United States of Brazil, at present residing at No. 355 Fourth avenue, New York city, New York, United States of America, have invented certain new and useful Improvements in Apparatus for Roasting Coffee or other Substances, (for which I have received Letters Patent in France No. 161,243, dated March 28, 1884, and in Belgium, No. 67,059, dated December 1, 1884,) of which the following is a specification.

The object of my invention is to roast or torrefy coffee, cocoa, cereals and other such substances, by means of hot air, a vacuum and devices for condensing the vapors arising from the substances.

In carrying out my invention, I make use of the well known law that substances in a vacuum give off their moisture or humidity and that if the vessel in which the evaporation takes place is connected with a condenser, the moisture or humidity will be precipitated. This operation is promoted by the use of a pump, which not only produces the desired vacuum, but also rapidly removes the vapors which it is sought to eliminate.

The accompanying drawings illustrate my improved apparatus for carrying out my process.

Figure 1 is a view partly in elevation and partly in section, showing the best form of apparatus now known to me, for carrying out my invention. I have also shown in this figure diagrammatically, some of the adjuncts of the apparatus. Fig. 2 is a plan view. Fig. 3 is a detail view of part of the heating apparatus. Fig. 4 is a detail view in section of the sampling faucet, and Fig. 5 is a bottom view thereof.

I employ a cylinder A, closed at each end by heads A', and supported on a frame B. Surrounding the cylinder is a jacket C, which is heated in the manner hereinafter specified. A shaft D, extends axially through the cylinder, and has bearings at $d$, in the heads A'. This shaft is provided with a series of stirrers or agitators D'. A gear wheel E, keyed to the shaft, gears with a pinion E' on the shaft $f$, mounted in bearings $f'$ in a standard F, and $f^2$ on the adjacent cylinder head A'; and this shaft carries a crank wheel $f^3$ connected by a rod $g$, with the piston $g'$, of a pump G. The shaft $f$, carries fast and loose pulleys H H', to which the driving belt may be connected.

A condenser I, of suitable construction is connected with a cold water supply K, by a pipe $i$, which terminates in a rose or sprinkler I'. A pipe $k$, connects the condenser with the pump G. The top or dome of the condenser I is connected by a pipe I², with a dome L, connecting with the interior of the cylinder A. This dome is provided with a man hole L', having a cover $l$, which may be opened and closed when desired. A man-hole M, in the bottom of the cylinder may be opened and closed by means of a plate $m$.

A manometer N, is provided for indicating the pressure within the cylinder during the operation of the apparatus, and the pyrometer O, indicates the temperature of the air in the heating jacket.

Within the jacket C, is arranged a series of perforated pipes $c$, communicating with a manifold C', which is connected by a pipe $c'$ with a heating apparatus C², which, in turn is connected by a pipe $c^3$, with a fan, blower or ventilator C³, and this, in turn, is connected by a pipe $c^4$ with the jacket C at $x$. By this organization, heated air may be supplied to the jacket and it will be observed that the heating medium circulates to and from the jacket, the air being used over and over again, and hence the heat is not wasted, but there is great economy in fuel.

In the lower part of the cylinder is arranged a sampling faucet P, by which samples of the substances being operated upon may be withdrawn. It comprises a conical plug $p$, arranged in a hollow conical stationary plug $p'$, extending through the jacket C. An opening $p^2$ communicates with the interior of the cylinder, and an opening $p^3$ communicates with the outside. The plug $p$ fits closely the interior of the stationary plug $p'$, but is free to revolve therein. It has a handle P', by which it may be turned in either direction. A vertical tubular chamber P² extends longitudinally through the plug $p$, and is arranged eccentrically to the axis thereof. When it registers with the opening $p^2$, it does not register with the opening $p^3$, and vice versa. By this means, a sample of the substance being treated may be withdrawn from the cylinder when the opening $p^2$ and the chamber $P^2$, and by causing the chamber $P^2$ and the opening $p^3$ to register, the sample may be withdrawn for inspection.

It is obvious that instead of revolving the shaft D, the cylinder may be made to revolve, and the shaft made stationary.

In operation, the substances to be dried, roasted or "torrefied" are placed in the cylinder A, and the agitator shaft set in motion. At the same time, the pump G, is operated, a vacuum is formed in the cylinder while the substances are being agitated, and the vapors immediately begin to rise from the substances and are drawn into the condenser I, which is interposed between the pump and the cylinder. On entering the condenser, the vapors are condensed by means of the cold water supplied through the pipe $i$. By continuing the operation, all the vapors are removed from the substances being treated by the combined action of heat, a vacuum and the condenser.

By means of the sampling faucet, the condition of the substances may be examined, and the process stopped at the proper time.

The substance to be treated is supplied through the man-hole L' and withdrawn through the man-hole M.

I claim as my invention—

1. An apparatus for roasting coffee, chicory and such like substances, comprising a close or imperforate vessel in which the substances are contained while being treated, an air-tight jacket surrounding the vessel, a series of perforated pipes contained within the jacket, means for agitating the material a heater, connections between the heater and the perforated pipes through which the heated air is admitted to the jacket, a fan blower or ventilator, connections between the blower and the heater and return pipes connecting the jacket to the heater and blower for withdrawing air from the jacket, the organization being such that a circulation of heated air from the fan and heater through the perforated pipes to the jacket is effected and the heated air is carried from the jacket to the blower and heater, substantially as described.

2. An apparatus for roasting coffee, chicory and such like substances, comprising a cylindrical vessel in which the substances are contained while being treated, an air-tight jacket surrounding the vessel, a series of perforated pipes contained within the jacket, a blower for forcing air to the perforated pipes, means for heating the air before it reaches the pipes, pipe connections between the perforated pipes and the blower, and pipe connections between the jacket and the blower for withdrawing air from the jacket, returning it to the blower, and again returning it to the perforated pipes, a pump for withdrawing vapors &c. from the vessel in which the substances being treated are contained, a condenser for condensing the vapors withdrawn from the vessel, and means for agitating the contents of the vessel while being treated.

3. A drying, heating or evaporating apparatus comprising a vessel in which the material to be heated or evaporated is contained, a heater, a blower, pipe connections between the heater and the blower, air circulating chambers or passages in close proximity to the vessel containing the material to be heated, and pipe connections between the said chambers or passages and the blower and heater, whereby a circulation of heated air is caused to enter said chambers or passages, is withdrawn therefrom and returned to the heater and again heated and means for agitating the material being treated.

4. The combination of the cylinder A, a jacket C, surrounding it, a stationary plug $p'$ extending through the cylinder and the jacket, and having the openings $p^2$ $p^3$, a conical plug $p$ within the stationary hollow plug, and having a tubular chamber $P^2$ extending longitudinally through it, arranged eccentrically and adapted to register with either the opening $p^2$ or the opening $p^3$, and a handle for turning the plug.

In testimony whereof I have hereunto subscribed my name.

DANIEL P. F. CARDOZO.

Witnesses:
JOHN HUNT,
E. J. LOWRY.